US012645861B1

(12) United States Patent
Gassner et al.

(10) Patent No.: US 12,645,861 B1
(45) Date of Patent: Jun. 2, 2026

(54) SYSTEMS AND METHODS FOR GENERATING CUSTOM DYNAMIC VIEW LAYOUTS AND VIEW LAYOUT PROFILES

(71) Applicant: Veeva Systems Inc., Pleasanton, CA (US)

(72) Inventors: Peter Gassner, Pleasanton, CA (US); Andrew Han, Needham, MA (US); Arno Sosna, Pleasanton, CA (US); Bobby Ng, San Ramon, CA (US)

(73) Assignee: Veeva Systems Inc., Pleasanton, CA (US)

( * ) Notice: Subject to any disclaimer, the term of this patent is extended or adjusted under 35 U.S.C. 154(b) by 368 days.

(21) Appl. No.: 18/530,374

(22) Filed: Dec. 6, 2023

(51) Int. Cl.
G06F 40/106 (2020.01)
G06F 40/186 (2020.01)

(52) U.S. Cl.
CPC .......... G06F 40/106 (2020.01); G06F 40/186 (2020.01)

(58) Field of Classification Search
CPC .............................. G06F 40/106; G06F 40/186
See application file for complete search history.

(56) References Cited

U.S. PATENT DOCUMENTS

| | | | | |
|---|---|---|---|---|
| 11,514,232 | B2 * | 11/2022 | Sullivan ................ | G06F 40/106 |
| 2021/0264546 | A1 * | 8/2021 | Reis ........................ | G06Q 50/14 |
| 2025/0209259 | A1 * | 6/2025 | Pande ................... | G06F 40/106 |

OTHER PUBLICATIONS

Florian Windhager et al., Visualization of Cultural Heritage Collection Data: State of the Art and Future Challenges, Apr. 27, 2018, IEEE Transactions on Visualization and Computer Graphics, vol. 25, No. 6, pp. 2311-2330 (Year: 2018).*
Philip Effinger et al., An Interactive Layout Tool for BPMN, Jul. 1, 2009, IEEE Conference on Commerce and Enterprise Computing, pp. 399-406 (Year: 2009).*

* cited by examiner

*Primary Examiner* — Tam T Tran

(57) ABSTRACT

Systems and methods for generation, categorization and rendering of custom dynamic view layouts of secure customer data of a data storage, including systems and methods for generation and management of multiple view layouts of secure customer data enabled using a view layout profile. Custom dynamic view layouts are established, wherein each custom dynamic view layout corresponds to a data object type and comprises at least one page including one or more sections used to organize a subset of a data object of the data object type from the data storage. Custom dynamic view layouts are assigned to view layout profiles. The view layout profile is referenced to identify a matching object type to the accessed data object record from the data storage. The matching custom view layout is used to render and display the subset of data fields defined in the identified approved custom dynamic view layout.

19 Claims, 11 Drawing Sheets

400

401 START

403 ACCESSING DATA OBJECT FROM THE DATA STORAGE

405 DETERMINATION WHETHER VIEW LAYOUT PROFILE IS ENABLED

407 DETERMINATION WHETHER THE ACCESSED DATA OBJECT TYPE HAS ONE OR MORE VIEW LAYOUTS ASSIGNED IN THE VIEW LAYOUT PROFILE

409 DETERMINATION WHETHER AN OBJECT TYPE VIEW LAYOUT IS DEFINED IN THE SYSTEM CORRESPONDING TO THE ACCESSED DATA OBJECT

411 DETERMINATION WHETHER DEFAULT OBJECT VIEW LAYOUT IS DEFINED

413 RETRIEVING THE SUBSET OF DATA FIELDS OF THE DATA OBJECT DEFINED IN THE VIEW LAYOUT

415 APPLYING AND ENFORCING LAYOUT RULES AS DEFINED IN THE VIEW LAYOUT

417 RENDERING THE SUBSET OF DATA FIELDS OF THE DATA OBJECT DEFINED IN THE VIEW LAYOUT

419 END

100

200

206

104

1046

400

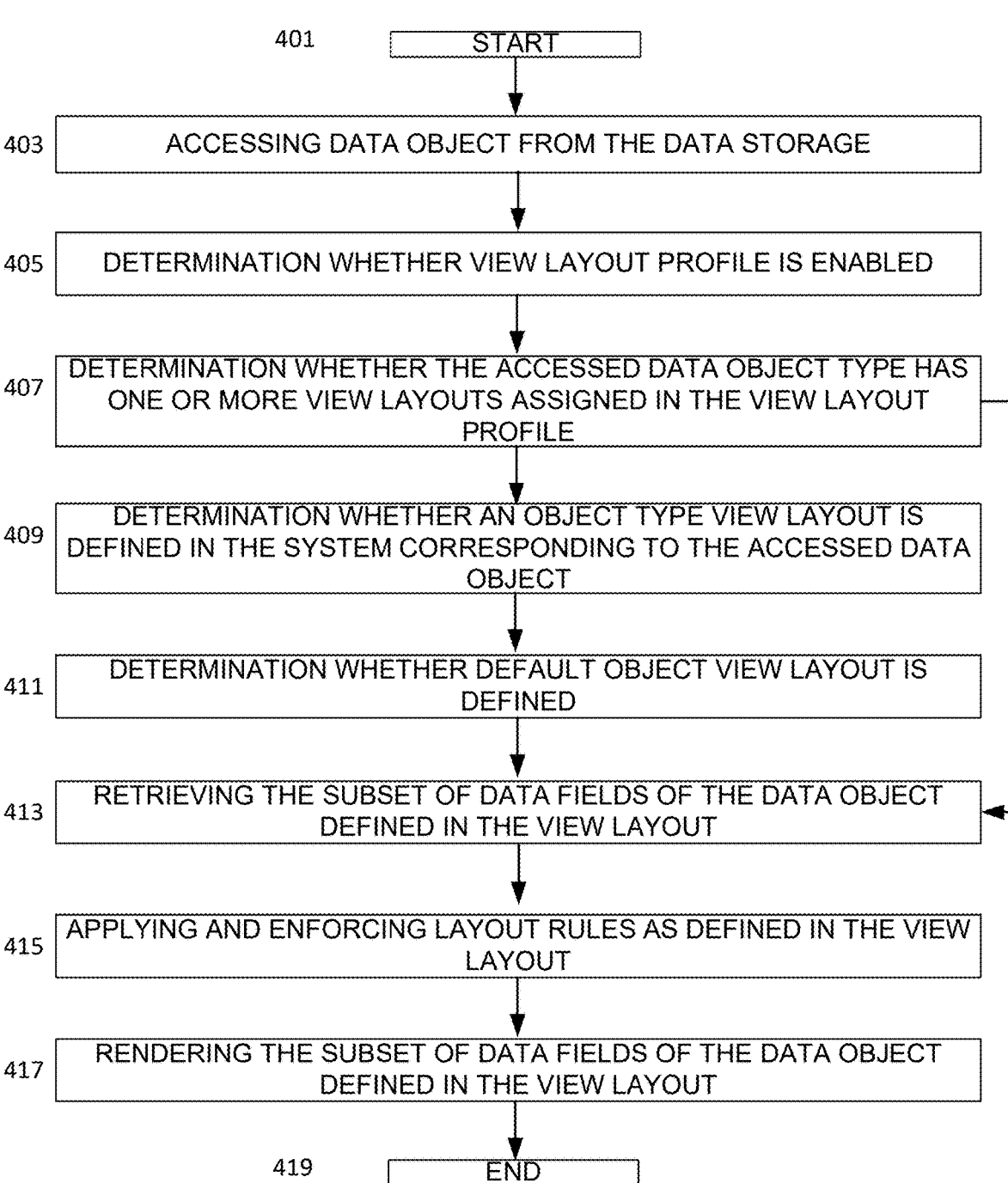

401     START

403     ACCESSING DATA OBJECT FROM THE DATA STORAGE

405     DETERMINATION WHETHER VIEW LAYOUT PROFILE IS ENABLED

407     DETERMINATION WHETHER THE ACCESSED DATA OBJECT TYPE HAS ONE OR MORE VIEW LAYOUTS ASSIGNED IN THE VIEW LAYOUT PROFILE

409     DETERMINATION WHETHER AN OBJECT TYPE VIEW LAYOUT IS DEFINED IN THE SYSTEM CORRESPONDING TO THE ACCESSED DATA OBJECT

411     DETERMINATION WHETHER DEFAULT OBJECT VIEW LAYOUT IS DEFINED

413     RETRIEVING THE SUBSET OF DATA FIELDS OF THE DATA OBJECT DEFINED IN THE VIEW LAYOUT

415     APPLYING AND ENFORCING LAYOUT RULES AS DEFINED IN THE VIEW LAYOUT

417     RENDERING THE SUBSET OF DATA FIELDS OF THE DATA OBJECT DEFINED IN THE VIEW LAYOUT

419     END

FIG. 4

Figure 9:
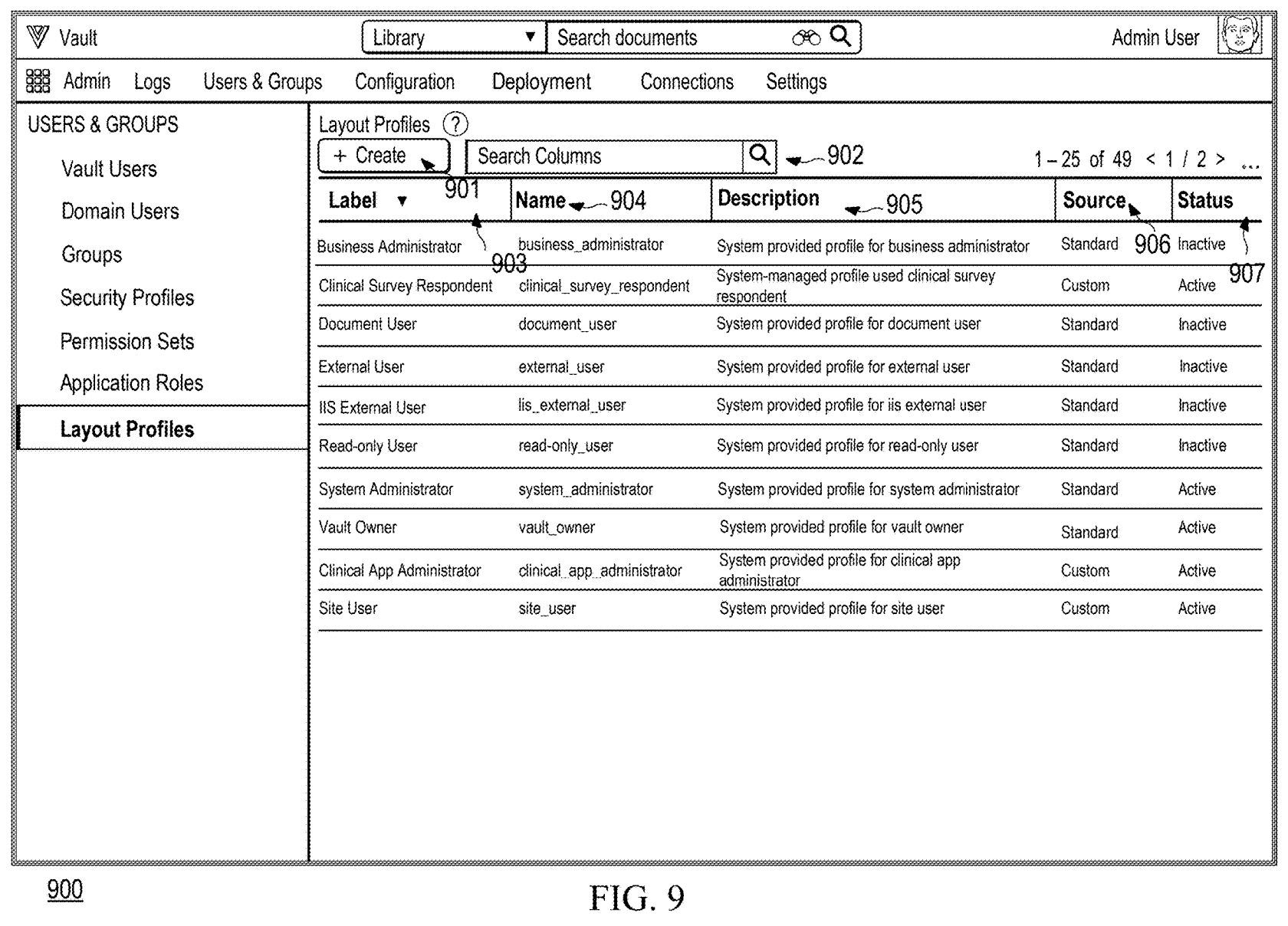

| | | |
|---|---|---|
| ▽ Vault | | Admin User 👤 |

Admin   Logs   Users & Groups  |  Library   ▾   Search documents   👓 🔍

Configuration   Deployment   Connections   Settings

USERS & GROUPS

Vault Users

Domain Users

Groups

Security Profiles

Permission Sets

Application Roles

Layout Profiles

Layout Profiles ⑦

[ + Create ▾ ]  ~~901~~     [ 🔍 Search Columns ]  ~~902~~

1 – 25 of 49   < 1 / 2 >   ⋯

| Label ▾ ~904 ~903 | Name ~904 | Description ~905 | Source ~906 | Status ~907 |
|---|---|---|---|---|
| Business Administrator | business_administrator | System provided profile for business administrator | Standard | Inactive |
| Clinical Survey Respondent | clinical_survey_respondent | System-managed profile used clinical survey respondent | Custom | Active |
| Document User | document_user | System provided profile for document user | Standard | Inactive |
| External User | external_user | System provided profile for external user | Standard | Inactive |
| IIS External User | iis_external_user | System provided profile for iis external user | Standard | Inactive |
| Read-only User | read-only_user | System provided profile for read-only user | Standard | Inactive |
| System Administrator | system_administrator | System provided profile for system administrator | Standard | Active |
| Vault Owner | vault_owner | System provided profile for vault owner | Standard | Active |
| Clinical App Administrator | clinical_app_administrator | System provided profile for clinical app administrator | Custom | Active |
| Site User | site_user | System provided profile for site user | Custom | Active |

Figure 10:
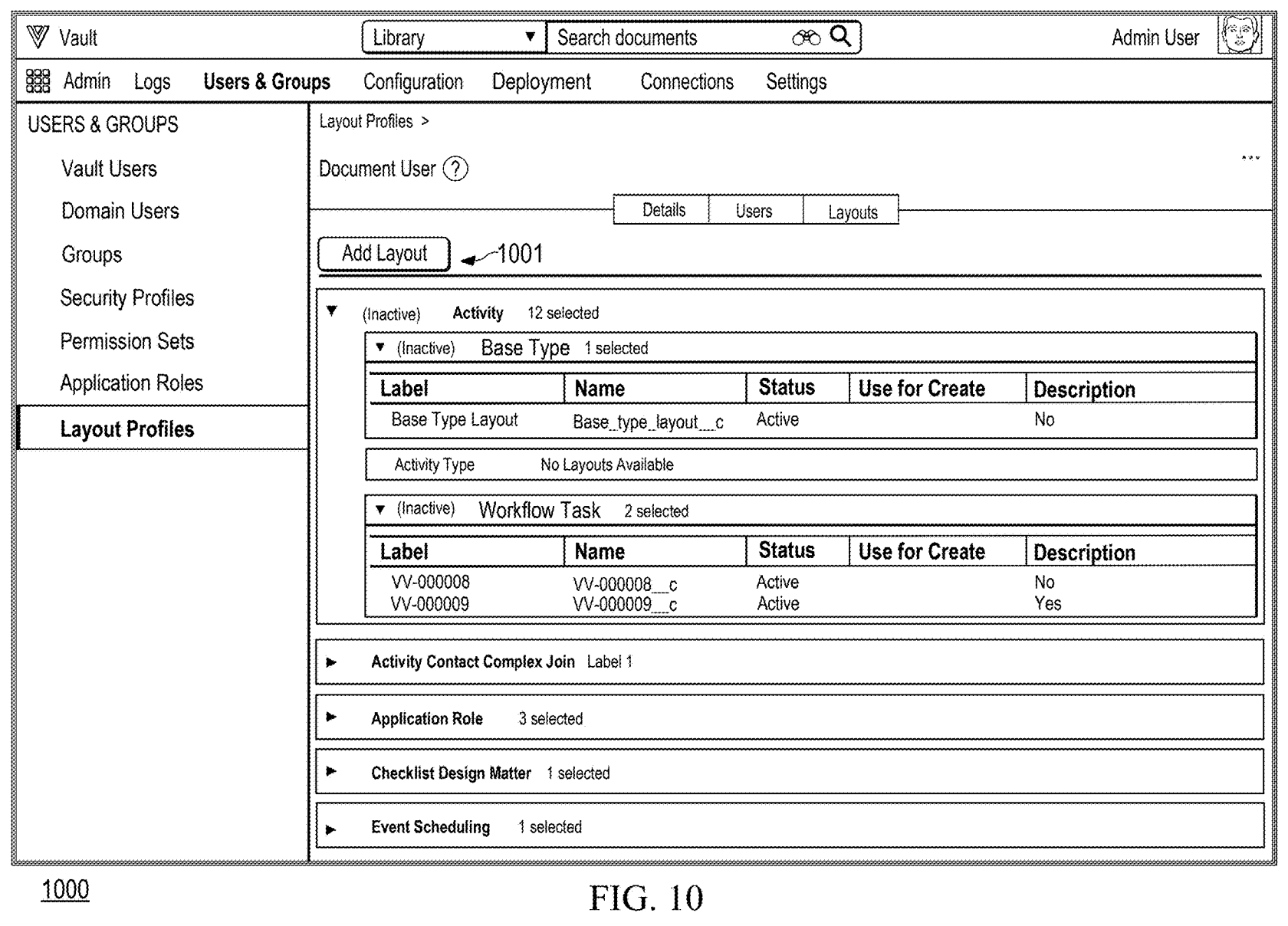

Vault

Admin User

Admin    Logs    Users & Groups    Configuration    Deployment    Connections    Settings Library    ▼    Search documents

USERS & GROUPS

Layout Profiles >

Vault Users

Document User ⑦

Domain Users

Groups

Security Profiles

Permission Sets

Application Roles

Layout Profiles

Details | Users | Layouts

Add Layout    ⟋1001

▶    (Inactive)    Activity    12 selected

▼    (Inactive)    Base Type    1 selected

| Label | Name | Status | Use for Create | Description |
|---|---|---|---|---|
| Base Type Layout | Base_type_layout____c | Active | | No |

Activity Type        No Layouts Available

▼    (Inactive)    Workflow Task    2 selected

| Label | Name | Status | Use for Create | Description |
|---|---|---|---|---|
| VV-000008 | VV-000008___c | Active | | No |
| VV-000009 | VV-000009___c | Active | | Yes |

▲    Activity Contact Complex Join    Label 1

▲    Application Role    3 selected

▲    Checklist Design Matter    1 selected

▲    Event Scheduling    1 selected

SYSTEMS AND METHODS FOR GENERATING CUSTOM DYNAMIC VIEW LAYOUTS AND VIEW LAYOUT PROFILES

TECHNICAL FIELD

The present disclosure relates generally to systems and methods that provide for custom dynamic view layouts of secure customer data, including methods and systems for generation and management of multiple view layouts of secure customer data enabled using a view layout profile.

BACKGROUND

Customer relationship management ("CRM") and other data storage systems are widely used to manage data for various types of organizations ("Customer"). User interfaces of the data management systems usually have a number of fields, e.g., a field for a doctor's name, and a field for the doctor's phone number. Such user interfaces are convenient for data entry, but not convenient for users to understand and utilize the data. Different roles within the organization may utilize different fields used within the CRM more frequently than others. For example, the customer data used by the quality assurance team may vary compared to the customer data used by the pharmaceutical representatives. The quality assurance team may track quality related data fields concerning products while the pharmaceutical representatives may be more concerned with sales related data fields concerning health care providers ("HCPs"). CRM systems typically do not allow much customization for the presentation of retrieved customer data. Customers may configure different fields to be stored in the CRM, but the data fields are displayed in a list with minimal categorization in a singular default fashion. It is desirable to provide a system and method for visualizing the data in an organized manner, and rendering the data in multiple formats at run-time that is easier for users to digest and utilize.

SUMMARY OF THE INVENTION

Embodiments disclosed in the present document provide a machine-implemented method for generation, categorization, and rendering of custom dynamic view layout of secure customer data of a data storage. The machine-implemented method comprises: accessing a first data object with a first data object type from the data storage upon successful authentication of a first user ID; establishing a first custom dynamic view layout, wherein the first custom dynamic view layout corresponds to a second data object type and comprises at least one page including one or more sections used to organize a subset of a second data object of the second data object type from the data storage; establishing a second custom dynamic view layout, wherein the second custom dynamic view layout corresponds to a third data object type and comprises at least one page including one or more sections used to organize a subset of a third data object of the third data object type from the data storage; determining whether a view layout profile is enabled for the first user ID, wherein the view layout profile defines a list of approved custom dynamic view layouts corresponding to an object type of a data object for the first user ID; assigning the first custom dynamic view layout to the view layout profile for the first user ID; assigning the second custom dynamic view layout to the view layout profile for the first user ID; comparing the first data object type, the second data object type and third data object type to identify an approved custom dynamic view layout corresponding to the object type of a data object for the first user ID that matches the first data object type of the accessed first data object from the data storage; retrieving a subset of data fields of the first data object defined in the identified approved custom dynamic view layout; enforcing layout rules defined in the identified approved custom dynamic view layout; and rendering the subset of data fields of the first data object defined in the identified approved custom dynamic view layout and displaying the rendered identified approved custom dynamic view layout to a display.

BRIEF DESCRIPTION OF THE DRAWINGS

For a more complete understanding of the present application and its advantages, references are now made to the following description taken in conjunction with the accompanying drawings, in which like reference numbers indicate like features.

FIG. 4 illustrates an exemplary flow diagram of generation, categorization, and display of custom dynamic view layouts of secure customer data according to one embodiment of the present invention.

FIG. 9 illustrates an example of a user interface for managing view layout profiles according to one embodiment of the present invention.

FIG. 10 illustrates an example of a user interface for configuring a view layout profile according to one embodiment of the present invention.

Although similar reference numbers may be used to refer to similar elements for convenience, it can be appreciated that each of the various example embodiments may be considered to be distinct variations.

Figure 1:
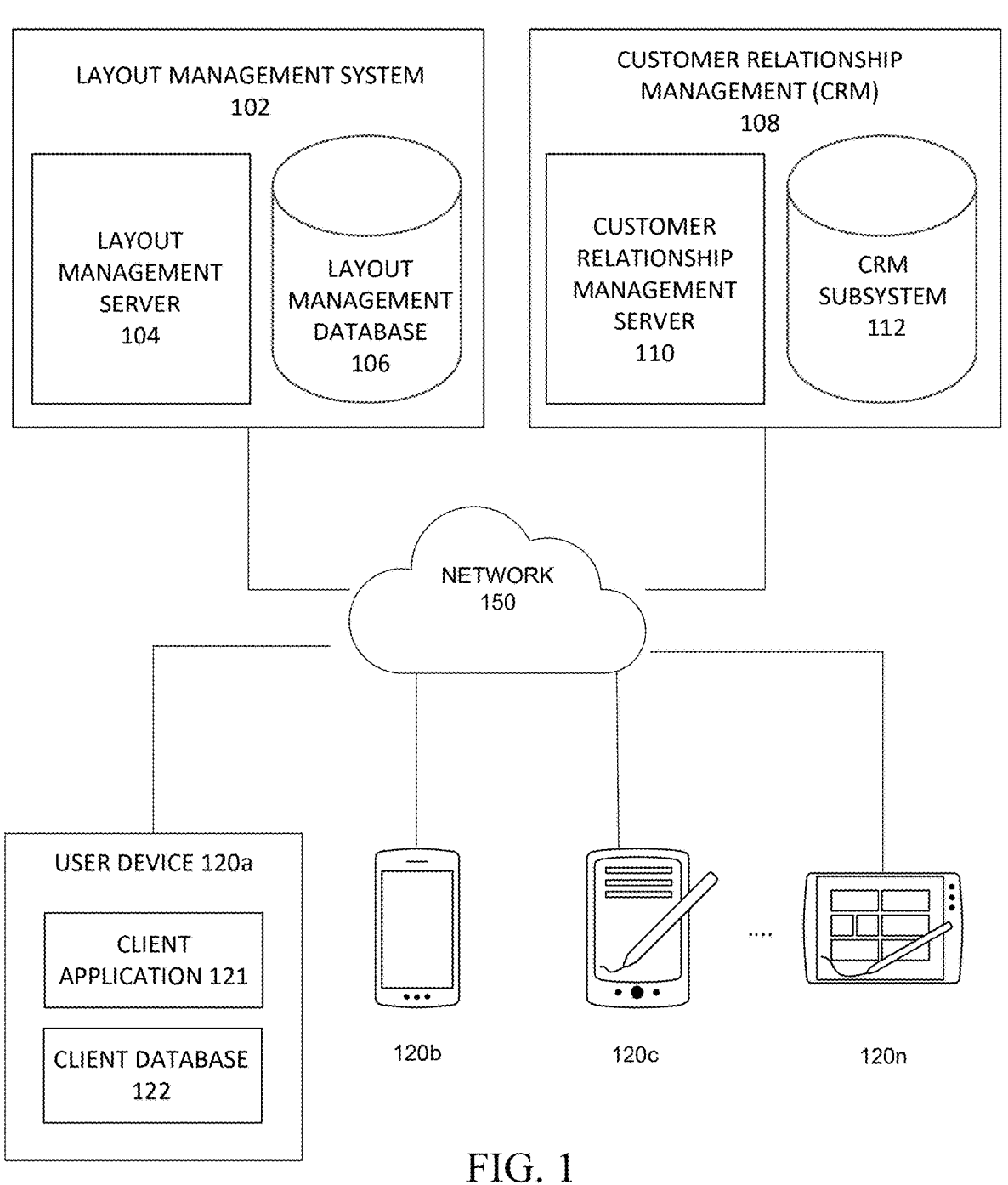
FIG. 1 illustrates an exemplary high level block diagram of an architecture for generation and management of custom dynamic view layouts of secure customer data wherein the present invention may be implemented.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

There is a need for a system supporting the categorization and organization of secure customer data such that dynamically generated custom view layouts may be displayed at run-time based on user profiles configured for different roles or functions. Customer relationship management ("CRM") and other data storage systems typically present data in lengthy default lists without much flexibility for customization for improved functionality. Customers may configure different fields to be stored in the CRM, but as long as users have the same security privileges, the data is presented with no discrimination in the same singular default fashion. It is desirable to provide a system and method enabling flexible custom dynamic display of a subset of secure customer data at run-time and rendering the organized custom dynamic data layouts according to associated user profiles.

Embodiments disclosed in the present invention allow for the generation, categorization, and rendering of organized secure customer data by providing for a system and method for the generation and management of at least one custom dynamic view layout. According to one aspect of the subject technology, each object record in the data storage may have a defined view layout. A view layout may be defined based on object record type. For example, a health care professional (HCP) may be employed at both a private practice and a hospital. Using record types may allow a distinct view layout for the private practice and another distinct view layout for the hospital. Depending on where the interaction with the HCP took place, different fields, picklist values, and information may be presented based on the respective object record type. In one implementation, a layout may have one or more pages. A page may represent a group of one or more sections, with a section representing a group of one or more object record data fields.

According to another aspect of the subject technology, embodiments disclosed in the present invention also allow for the generation, categorization, and rendering of custom dynamic view layouts comprising secure customer data by providing for a system and method for the generation and management of at least one view layout using at least one view layout profile. In one implementation, each object record in the data storage may have at least one defined view layout. A view layout may be defined based on object record type. There may be multiple defined view layouts associated with each object record in the data storage. A view layout profile may be configured with a collection of view layouts for various object records in the data storage. The view layout profile may be associated with a user ID, such that when a user ID accesses an object record, the view layout(s) for the object(s) defined in the view layout profile is selected and displayed.

In another implementation, when no view layout profile is present or a view layout is not defined in the view layout profile for a data object record, a default view layout is used when a user ID access the associated data object record. A custom dynamic view layout may be generated for an object record and set as the default view layout. Similarly, a custom dynamic view layout may be generated based on object record type and set as the default view layout for the object record type.

FIG. 1 is a system overview illustrating an embodiment of a custom dynamic view layouts system 100 wherein the present invention may be implemented. The presently disclosed embodiment comprises a customer relationship management (CRM) system 108, a plurality of user computing devices 120a, 120b, . . . 120n, and a layout management system 102, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the customer relationship management 108 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the customer relationship management 108 via the network 150. To enable a user (e.g., pharmaceutical representative) to use the client application 121 even when the user computing devices 120a-120n are disconnected and provide seamless transition between online and offline use, a client database 122 for the client application 121 may store a subset of the customer data in the CRM 108 which may be needed to support the user's (e.g., pharmaceutical representative) use of the client application 121. In order to provide user's correct and newest information, the client database 122 may be synchronized with the CRM 108 regularly according to a preset schedule, when the user computing device is back online, and/or when the user requests for synchronization. User computing devices 120a-120n are illustrated in more detail in FIG. 2.

Although the users may be described in the present application as being company representatives, this particular embodiment is not intended to limit the generality of the claims that may eventually issue in patents stemming from the present disclosure. The customer relationship management (CRM) 108 may have a CRM server 110 and a CRM subsystem 112.

The CRM server 110 is typically a remote computer system accessible over a remote or local network, such as the network 150. A client application (e.g., 121) process may be active on one or more user computing devices 120a-120n, and the corresponding server process may be active on the CRM server 112. The client application process and the corresponding server process may communicate with each other over the network 150, thus providing distributed functionality and allowing multiple client applications to take advantage of the information-gathering capabilities of the CRM 108. The CRM server 110 may control access to data in the CRM subsystem 112.

The customer relationship management subsystem 112 contains all professional information of health care providers (HCPs) that may be available to users, including contact information, licensing information, areas of practice, and specialties. In addition, the customer relationship management subsystem may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users). In other examples, the customer relationship management subsystem may have a content management subsystem and may provide approved content and templates of approved communications.

In this embodiment, the customer relationship management 108 is capable of communication with multiple sources through the customer relationship management server 110 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem pulls the approved version of what represents an account or physician, which then pulls from multiple networks to ensure that the information regarding an account is up-to-date. The customer relationship management 108 may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management 108, this system may be a cloud-based customer database that provides a central access to store and distribute consistent data across customer companies as well as their possible third-party partners and agencies that are used to keep this data updated. This system can provide standard data formats and provide an easy and automated way for customers (e.g. pharmaceutical companies) and/or users (e.g. pharmaceutical representatives) to have access to coordinated and frequently updated CRM data and to use that coordinated data for sending approved electronic communications in accordance with the system described herein. Within the customer relationship management subsystem, customer accounts may be assigned a visibility framework based on territory tags which determine which data is accessible to which users.

The layout management system 102 may include a layout management server 104, and a layout management database 106. The layout management server 104 may be used to, as shown in FIG. 4, control the process for dynamically generating custom view layouts of secure customer data in the data storage system (e.g., the CRM 108), assigning and managing the various view layouts in a view layout profile. The layout management server 104 is illustrated in more detail in FIG. 3.

In one embodiment, the client application 121 is a tool for helping users (e.g., pharmaceutical representatives) of customers (e.g., pharmaceutical companies) to promote products to accounts (e.g, HCPs). Each of the customers may store physician professional information it collected and/or purchased in the CRM 108. An administrative user of a customer (e.g, pharmaceutical company) may manage data availability to its users (e.g., pharmaceutical representatives) by territories, which could be a geographic area, an affiliation or a product. A user may access data in the CRM 108 of the pharmaceutical company the user works for, specifically data for HCPs in one or more territories he/she is assigned. A customer may store information of tens of thousands of HCPs and hundreds of products in the CRM 108, but a user may be allowed to access information of only a subset of the available accounts (e.g., HCPs).

In one implementation, the client database 122 may store a subset of data from the CRM subsystem 112 which may be needed to support the operation of the client application 121. The data in the client database 122 may be associated with a specific user (e.g., pharmaceutical representative), and only data that the user is allowed to use when running the client application 121 on his/her user computing device 120a may be downloaded to the user computing device 120a during synchronization with the CRM 108. Such information may include, e.g., data related to the subset of HCPs and/or products in his/her territory.

Figure 2:
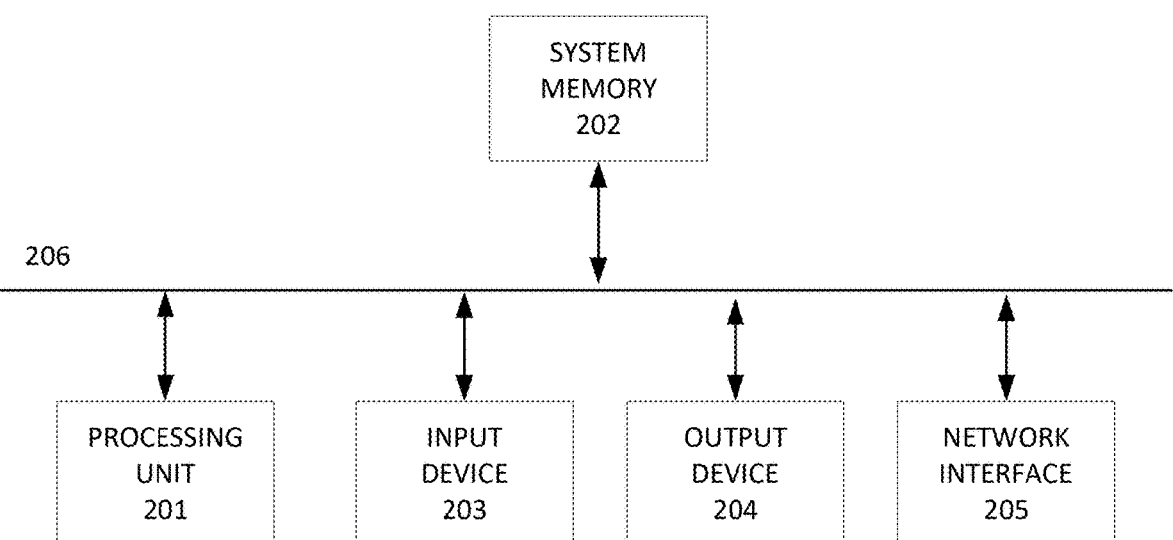
FIG. 2 illustrates an example high level block diagram of a computing device according to one embodiment of the present invention.

FIG. 2 illustrates an example high level block diagram of a computing device 200 which can be used as the user computing devices 120a-120n, the layout management server 104, and/or the CRM server 110 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205, and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer-readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
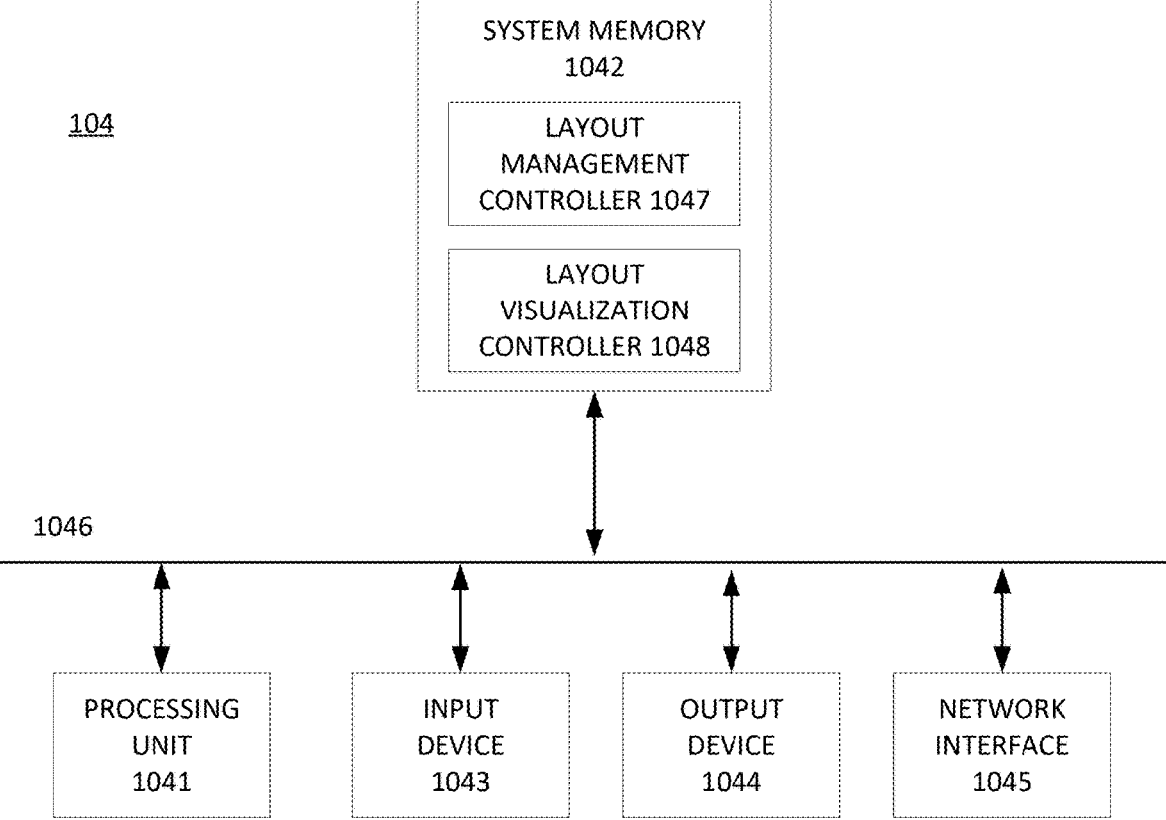
FIG. 3 illustrates an example high level block diagram of the layout management server according to one embodiment of the present invention.

FIG. 3 illustrates an example high level block diagram of the layout management server 104. The layout management server 104 may be implemented by the computing device 200 described above, and may have a processing unit 1041, a system memory 1042, an input device 1043, an output device 1044, and a network interface 1045, coupled to each other via a system bus 1046. The system memory 1042 may store a layout management controller 1047, which may be used to control the process for dynamic custom view layout generation as shown in FIG. 4. The system memory 1042 may also store a layout visualization controller 1048 that may control the process for configuring and rendering secure customer data from the customer relationship management subsystem 112 and the custom view layout dynamically generated by the layout management controller 1047. In one embodiment, the layout management server 104 may be implemented in a cloud environment, and the layout management controller 1047 may run on an elastic computing platform.

The present invention allows users to configure what to display from an object record and how to arrange and display the retrieved data on the custom dynamic view layout, so that users can utilize the CRM data better. A layout visualization interface may be used to generate the custom dynamic view layout, and may have code in a markup language for describing and defining the data fields on the dynamic view layout. One example of the markup language is HyperText Markup Language ("HTML"), and the HTML code may specify the CRM data to be displayed and their location on the custom dynamic view layout according to user configuration. The layout visualization interface may also have code in a programming language for describing the custom dynamic view layout's functionality, which may be, e.g., JavaScript code for specifying the objects and fields users want to query to obtain the CRM data to fill up the custom dynamic view layout. The layout visualization interface may also have CSS code for specifying the design or style of the layout, including visual effects and background. The layout visualization interface may also use MDL components library to configure the custom dynamic view layout data. The CRM data is returned to the data visualization interface in JSON format.

In another implementation, there may be code in a programming language for object controls, which may be, e.g. JavaScript code for apps to create their own user interface as a control inside a section or as an entire section in a page.

The present invention provides an application programming interface ("API") which may communicate with the JavaScript in the layout visualization interface and then query data and objects in the CRM subsystem 112 to get a result set.

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

In one implementation, the API may be a unified API which may query various types of data sources across multiple platforms, e.g., iOS, Windows, and the browser for Salesforce online. What a user frequently queries (e.g., the last five calls, most recent calls or all calls submitted) may be packaged up in well formed API calls. The JavaScript may communicate with the API only, and does not have to care about the type of the actual database to be queried. Multiple APIs from multiple providers, utilizing different API styles (e.g., REST, GraphQL, SOAP, RPC, etc.), may send payloads in various data formats (JSON, XLM, etc.) and use different data models. Meeting each providers integration requirements can be made in order to facilitate reliable connections with multiple providers.

FIG. 4 illustrates an exemplary flow diagram of generation, categorization, and rendering of custom dynamic view layouts of secure customer data 400 according to one embodiment of the present invention. The method begins at 401.

At 403, the layout management controller 1047 accesses a data object record in the data storage. In one implementation, the data storage may be the CRM subsystem 112. A customer may wish to create different subsets of the data object record based on different roles or functions. In the data object record hierarchy, a view layout may comprise a subset collection of the data object. Further, the view layout may comprise at least one page, with the at least one page comprising at least one section, and the at least one section comprising at least one data field of the data object record. This hierarchical categorization of the data object record allows for increased organization and functionality.

In one implementation, relevant sections containing various data fields may be grouped together in a given view layout. Pages may be toggled seamlessly to view data that have a specific context. Alternatively, relevant sections containing various data fields of the same data object record may be ordered differently on separate pages such that the presentation effectively highlights different aspects of the data object record. Each respective page may constitute a separate view layout, or both pages may collectively form a single view layout.

An exemplary view layout profile implementation and data schema may be seen below:

```
ComponentType Layoutprofile (
    label('Layout Profile'),
    label_plural ('Layout Profiles'),
    active(true),
    abbreviation('LPF'),
    record_listener_v('veeva.ecm.vof.infrastructure.mdl.VcfLayoutProfileHa
ndler'),
    cacheable(false),
    Attribute description(
        Label('Description'),
        Type('String'),
        Max_length(255),
        Requiredness('optional')
    )
);
Componenttype Objectlayout(
    label('Object Layout'),
    label_plural('Object Layouts')
    active(true),
    abbreviation('OBL'),
    parent('Layoutprofile'),
    record_listener('veeva.ecm.vof.infrastructure.VcfObjectLayoutHandler'),
    Attribute object(
```

-continued

```
    label('Object'),
    type('Component'),
    component_type('Object'),
    requiredness('required'),
    editable(true),
    multi_value(false),
    queryable(true)
),
Attribute objecttype(
    label('Object Type'),
    type('Component'),
    component_type('Objecttype'),
    requiredness('conditional),
    editable(true),
    multi_value(false),
    queryable(true)
),
Attribute pagelayouts(
    label('Layouts),
    type('Component'),
    component_type('PageLayout'),
    requiredness('required'),
    editable(true),
    multi_value(false),
    ordered(true),
    queryable(false)
),
Attribute record_creation_layout(
    label('Record Creation Layout'),
    type('Component'),
    component_type('Pagelayout'),
    requiredness('optional'),
    editable(true),
    multi_value(false),
    queryable(true)
),
);
```

At 405, the layout management controller 1047 determines whether a view layout profile is enabled. A custom dynamic view layout profile lists the view layouts that can be used on an object type for a set of user IDs, which layout is the default, and in what order the layouts are rendered if multiple view layouts are assigned. A view layout profile is described in more detail in corresponding FIGS. 9-11 below.

At 407, the layout management controller 1047 determines whether the accessed object type has one or more view layouts assigned in the enabled view layout profile identified in 405. In one implementation, when there is a custom dynamic view layout defined in the view layout profile for the user ID accessing the data object from the data storage, the defined custom dynamic view layout is used when rendering the subset of the data object record. If there is a view layout defined in the view layout profile corresponding to the object type accessed, the method skips to 413.

At 409, the layout management controller 1047 determines there was no corresponding view layout for the data object type accessed in 403 defined in the view layout profile. The layout management controller 1047 then determines whether an object type view layout is defined in the system corresponding to the data object type accessed in 403. In one implementation, when there is a defined system view layout for the object type, the layout management controller 1047 uses this view layout for the rendering of the subset of the data object record. If there is a view layout defined in the view layout profile corresponding to the object type accessed, the method skips to 413.

At 411, the layout management controller 1047 determines there was no object type view layout defined in the system corresponding to the accessed data object in 403 and no corresponding view layout for the data object type accessed in 403 defined in the view layout profile. The layout management controller 1047 then determines whether a default object view layout is defined. In on implementation, when there is no layout profile enabled, or no view layout assigned in the profile, and no view layout assigned at the object type, then the default view layout is used to render the subset of the data object record.

At 413, the layout visualization controller 1048 retrieves the subset of data fields of the data object defined in the view layout determined above. The CRM data is returned to the data visualization interface in JSON format.

At 415, the layout management controller 1047 applies and enforces layout rules as defined in the view layout. In one implementation, multiple view layouts may be defined in the view layout profile. The view layout profile defines which view layout is the primary, with the other view layouts defined in the view layout profile for the data object type being secondary. When rendering the data object, the view layout management controller 1047 renders the primary view layout first, with the secondary view layouts accessible via the drop down list 503 as depicted in FIG. 5.

In another implementation, there may be certain conditions where a particular view layout is preferred to be displayed on loading instead of the default view layout. The lifecycle state of a data object record is one such instance. Data object lifecycles are the sequences of states (e.g., In Review, Approved, Expired, Initial, Complete, etc.) that an object record can go through during its life. Each state is tied to either an Active or Inactive status. The data object record may be in the "In Review" state with an "Active" status, thus prompting the preferred initial display over the default view layout. The associated view layout may override the default view layout based on this conditional logic. Conversely, the "Expired" state may correspond to an "Inactive" status, such that the default view layout is preferred. The layout rules may assign a view layout as primary based on Initial, Complete, or Custom state and where the data object record is in their lifecycle. Each stage may require a different view layout depending on what documents or object records are relevant.

At 417, the layout management controller 1047 renders the subset of data fields of the data object as defined in the view layout as depicted in FIGS. 5-8. The method ends at 419.

Figure 5:
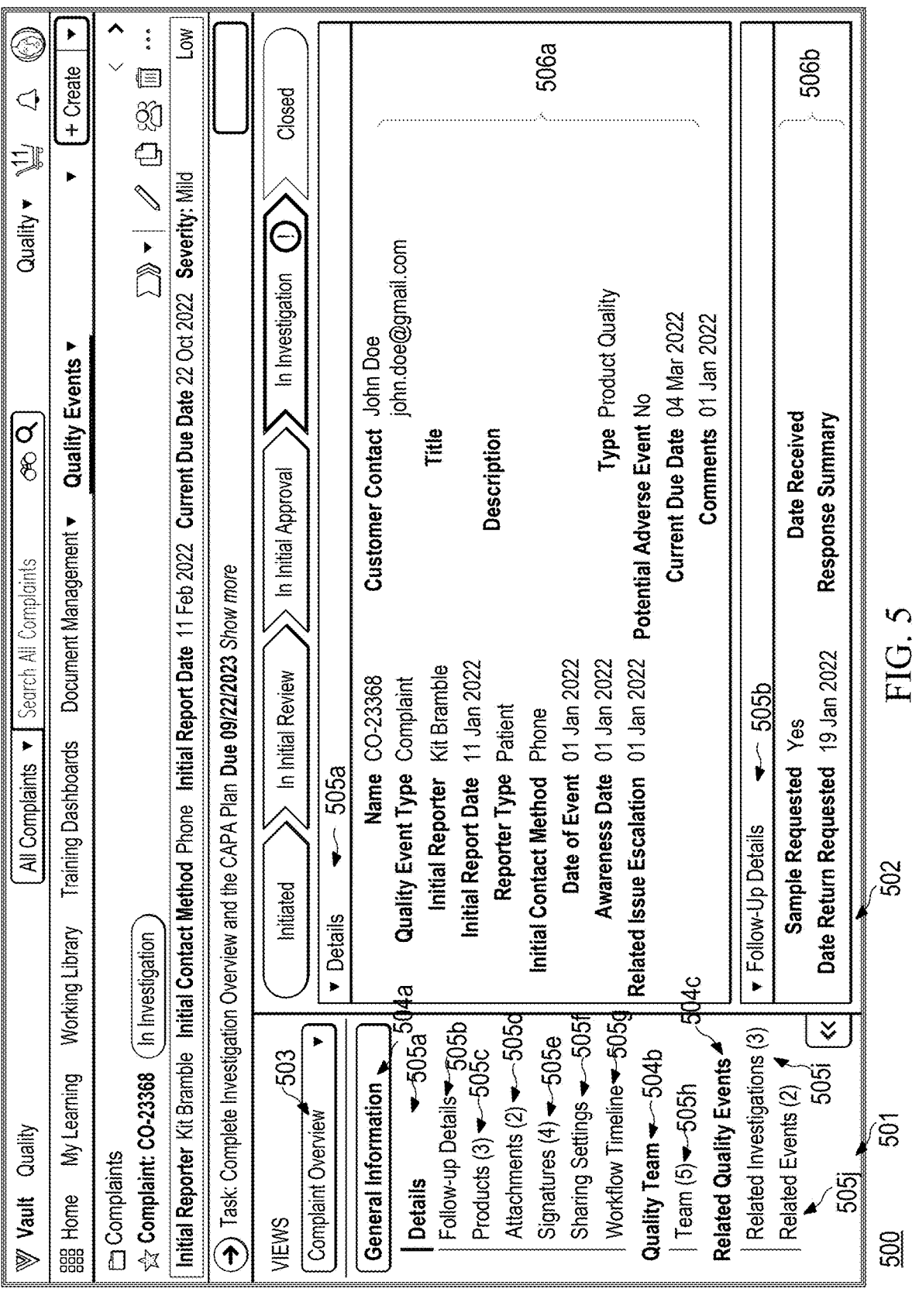
FIG. 5 illustrates an example of a user interface displaying a custom dynamic view layout of secure customer data according to one embodiment of the present invention.

FIG. 5 illustrates an example of a user interface displaying a custom dynamic view layout 500 of secure customer data according to one embodiment of the present invention. A dynamic view layout 500 allows the custom rendering of data fields on the user interface. In the data object record hierarchy, a view layout may comprise a subset collection of the data object. The view layout may comprise at least one page, with the at least one page comprising at least one section, and the at least one section comprising at least one data field of the data object record. This hierarchical categorization of the data object record allows for increased organization and functionality. As depicted, available custom dynamic view layouts may be accessed from the drop-down list 503. Different pages 504a, 504b, 504c may be accessed from the left hand vertical navigation menu 501. When selected the details for the respective page 504a, 504b, 504c is shown in the right panel 502. A page 504a, 504b, 504c consists of one or more sections 505a-j. Specifically, in the depicted example, the general information page 504a includes the details 505a, follow-up details 505b, products 505c, attachments 505d, signatures 505e, sharing settings 505f, and workflow timelines 505g sections. Similarly, the quality team page 504*b* includes a team section 505*h*. The related quality events page 504*c* includes related investigations 505*i* and related events 505*j* sections. A section 505*a-j* may consist of one or more data fields 506*a*, 506*b*. Specifically, in the depicted example, the follow-up details section 505*b* consists of four data fields 506*b*: sample requested, date return requested, date received, and response summary.

In one implementation, a custom dynamic view layout may be assigned as a default layout when the associated object record is accessed. Different object records may have different custom dynamic view layouts generated and assigned as default for rendering when the object record is accessed. In another implementation, object types may have multiple custom dynamic view layouts generated with one assigned as primary and the rest of the view layouts assigned as secondary. A custom dynamic view layout profile lists the view layouts that can be used on an object type for a set of user IDs, which layout is the default, and in what order the layouts are rendered if multiple view layouts are assigned. When a custom dynamic view layout profile is assigned to a user ID, the view layouts contained in the view layout profile override the default view layout assigned at the object level. The custom dynamic view layouts defined in the view layout profile will take precedence and rendered when the object record is accessed by the associated user ID.

In another implementation, if there is a custom dynamic view layout profile assigned but does not have a corresponding custom dynamic view layout assigned for the object record accessed, then the assigned view layout corresponding to the object type is used to render the object record. However, if there further is no assigned view layout corresponding to the object type, then the default view layout assigned to the base object type is used to render the object record.

Figure 6:
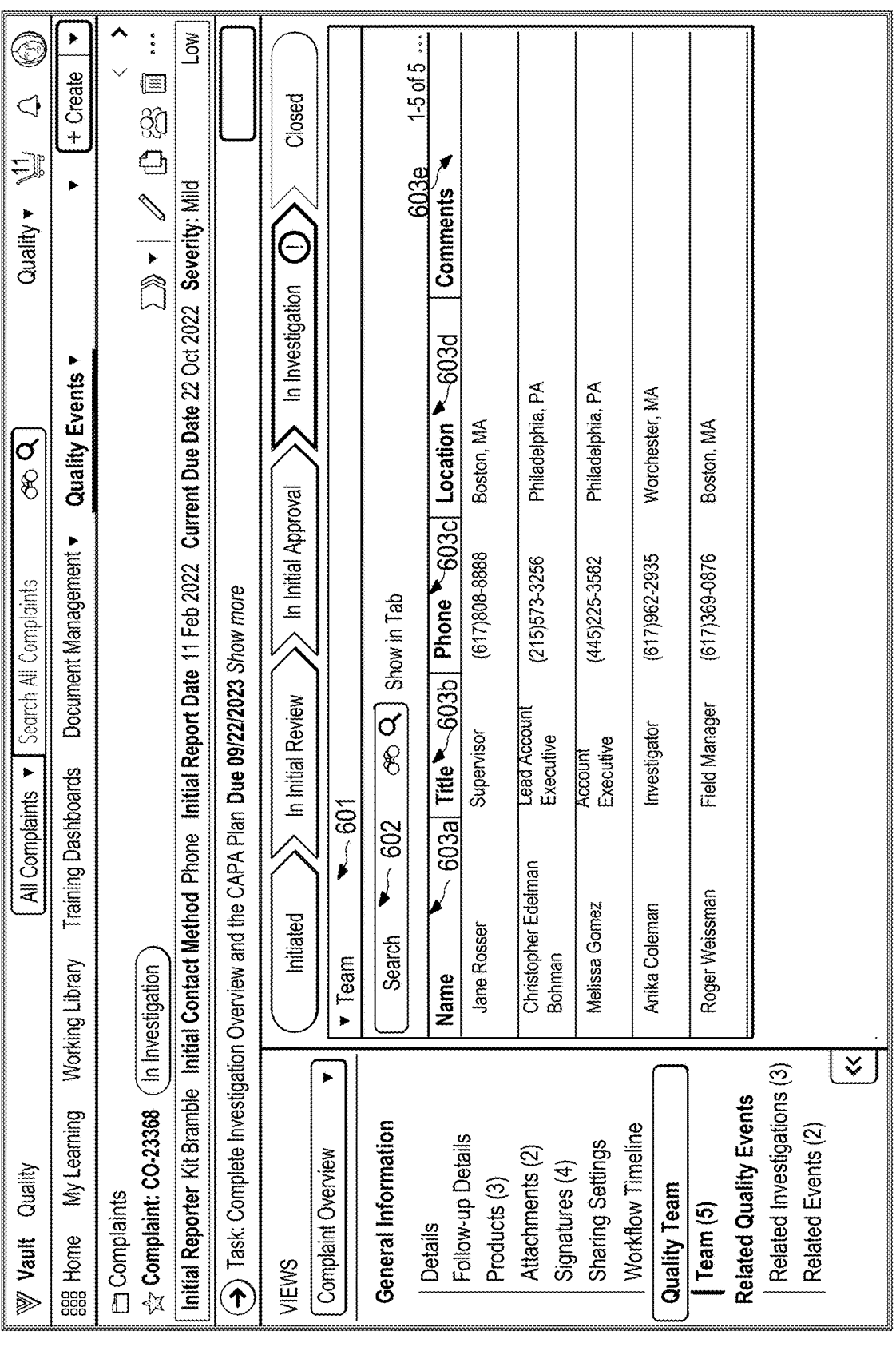
FIG. 6 illustrates another example of a user interface displaying a custom dynamic view layout of secure customer data according to one embodiment of the present invention.

FIG. 6 illustrates another example of a user interface displaying a custom dynamic view layout 600 of secure customer data according to one embodiment of the present invention. FIG. 6 corresponds to the same custom dynamic view layout as FIG. 5 depicting a Complaint Overview layout. However, this example depicts when the Quality Team page 504*b* is selected from the left hand vertical navigation menu. The Team section 601 includes a search bar 602, as well as data fields: Name 603*a*, Title 603*b*, Phone 603*c*, Location 603*d*, and Comments 603*e*.

Figure 7:
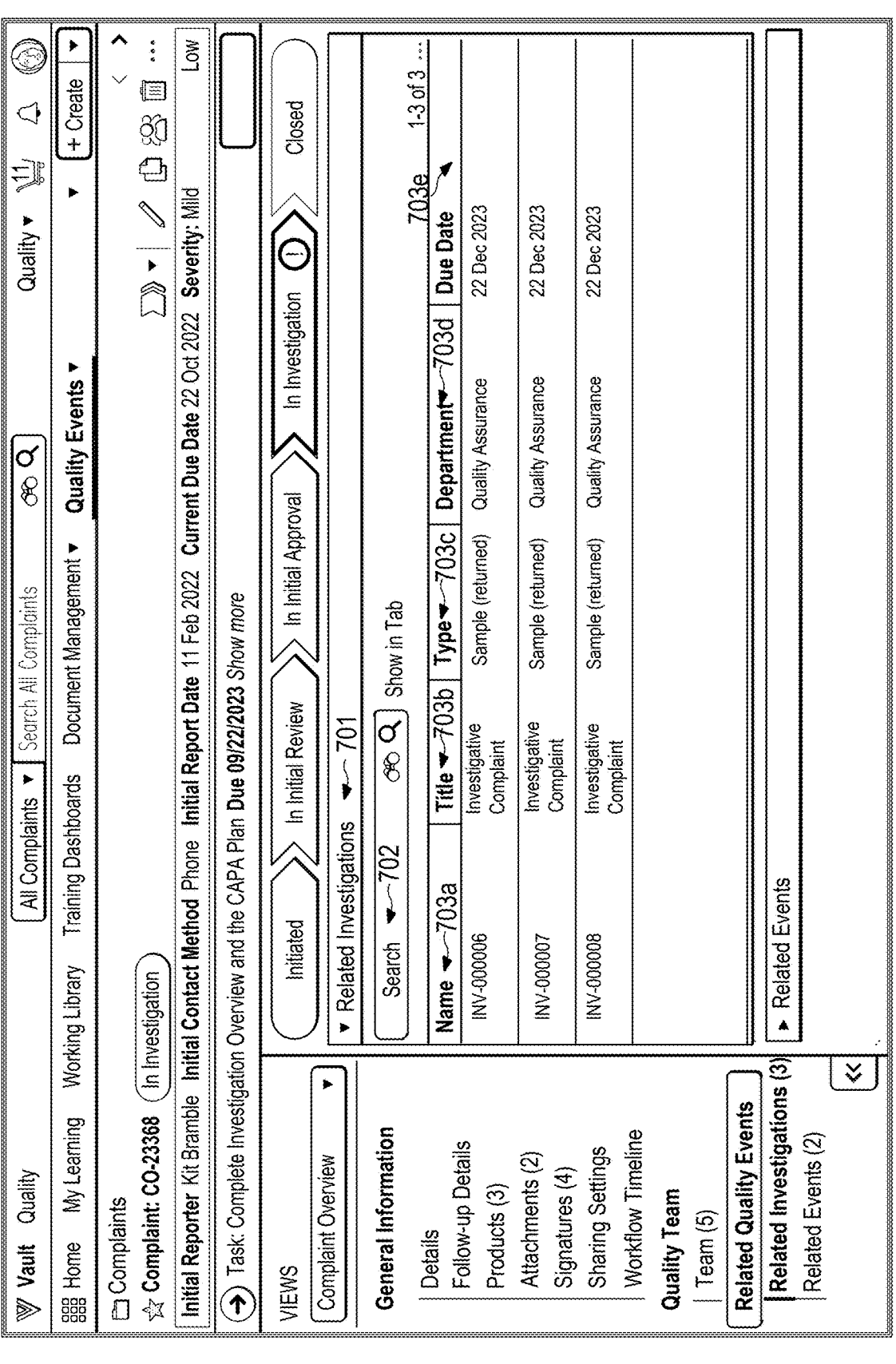
FIG. 7 illustrates another example of a user interface displaying a custom dynamic view layout of secure customer data according to one embodiment of the present invention.

FIG. 7 illustrates another example of a user interface displaying a custom dynamic view layout 700 of secure customer data according to one embodiment of the present invention. FIG. 7 corresponds to the same custom dynamic view layout as FIG. 5 depicting a Complaint Overview layout. However, this example depicts when the Related Quality Events page 504*c* is selected from the left hand vertical navigation menu. The Related Investigations section 701 includes a search bar 702, as well as data fields: Name 703*a*, Title 703*b*, Type 703*c*, Department 703*d*, and Due Date 703*e*.

Figure 8:
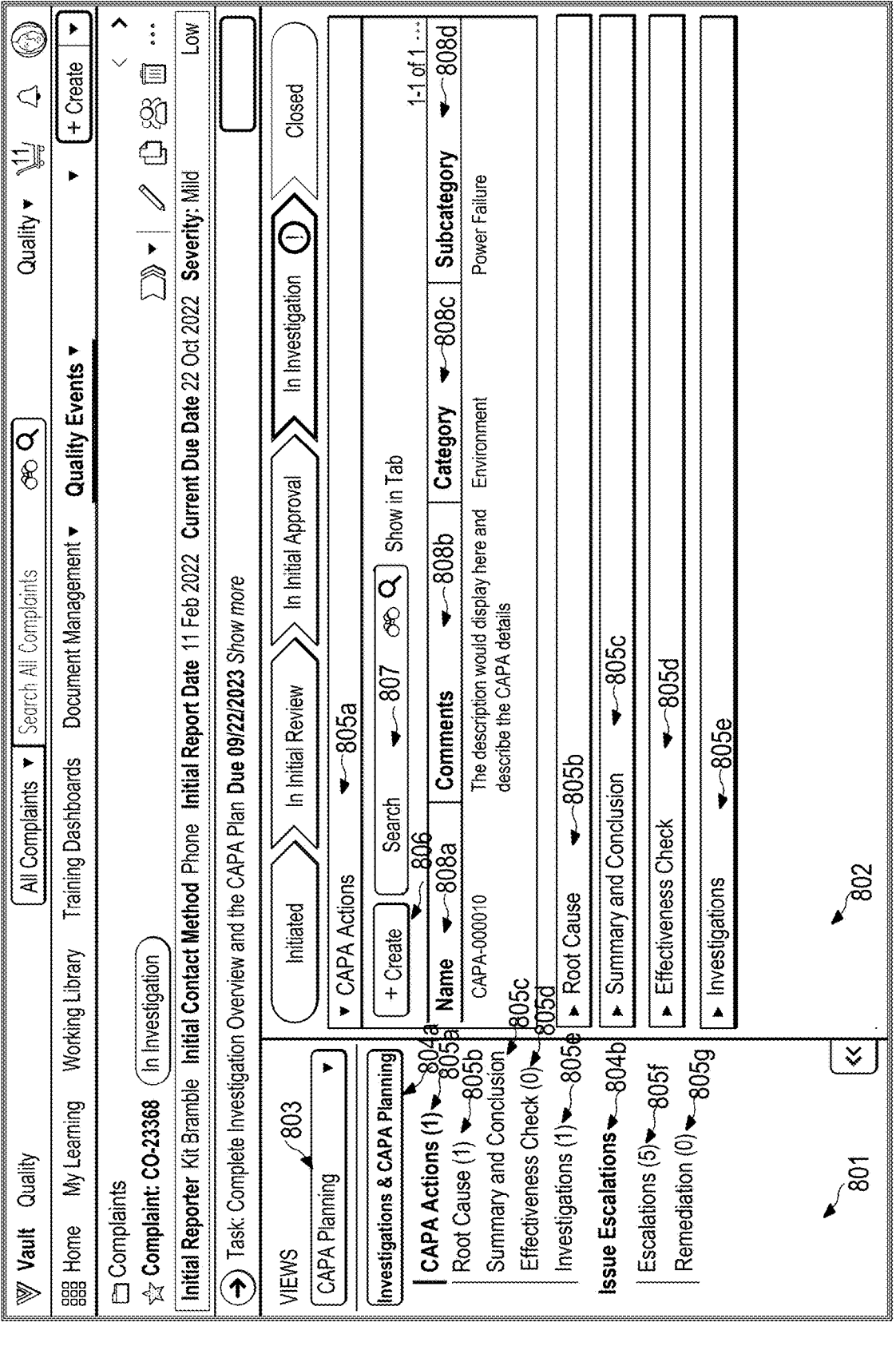
FIG. 8 illustrates an example of a user interface displaying another custom dynamic view layout of secure customer data according to one embodiment of the present invention.

FIG. 8 illustrates an example of a user interface displaying another custom dynamic view layout of secure customer data 800 according to one embodiment of the present invention. FIG. 8 corresponds to a different custom dynamic view layout for the same data object record as FIGS. 5-7. As depicted, available custom dynamic view layouts may be accessed from the drop-down list 803. Different pages 804*a*, 804*b* may be accessed from the left hand vertical navigation menu 801. When selected the details for the respective page 804*a*, 804*b* is shown in the right panel 802. A page 804*a*, 804*b* consists of one or more sections 805*a-g*. Specifically, in the depicted example, the investigations & CAPA planning page 804*a* includes the CAPA actions 805*a*, root cause 805*b*, summary and conclusions 805*c*, effectiveness check 805*d*, investigations 805*e* sections. Similarly, the issue escalations page 804*b* includes a escalations section 805*f* and remediation section 805*g*. A section 805*a-g* may consist of one or more data fields 808*a-d*. Specifically, in the depicted example, the CAPA actions section 805*a* consists of four data fields: name 808*a*, comments 808*b*, category 808*c*, and subcategory 808*d*. Further, the CAPA actions section 805*a* includes a create button 806 to add data field entries as well as a search toolbar 807 to quickly find pertinent data field entries of interest.

FIG. 9 illustrates an example of a user interface for managing view layout profiles according to one embodiment of the present invention. The layout profiles interface may be accessed from the left hand vertical menu. A layout profile lists the view layouts that can be used on an object type for a set of users, which layout is the default, and in what order the layouts are displayed if multiple layouts are assigned. Selecting any of the view layout profiles on the right panel opens the user interface depicted in FIG. 10, which allows the adding, editing and removing of view layouts in the view layout profile. A create button 901 allows the generation of a new view layout profile and opens the user interface depicted in FIG. 10. A search bar 902 allows the quick and convenient identification using text of a view layout profile. The user interface further includes: a label 903, name, 904, description 905, source 906, and status 907.

FIG. 10 illustrates an example of a user interface for configuring a view layout profile according to one embodiment of the present invention. The view layouts for respective object types and object records assigned to the view layout profile are listed. An add layout button 1001 opens the separate window depicted in FIG. 11 and allows the adding and removing of a view layout from the view layout profile.

Figure 11:
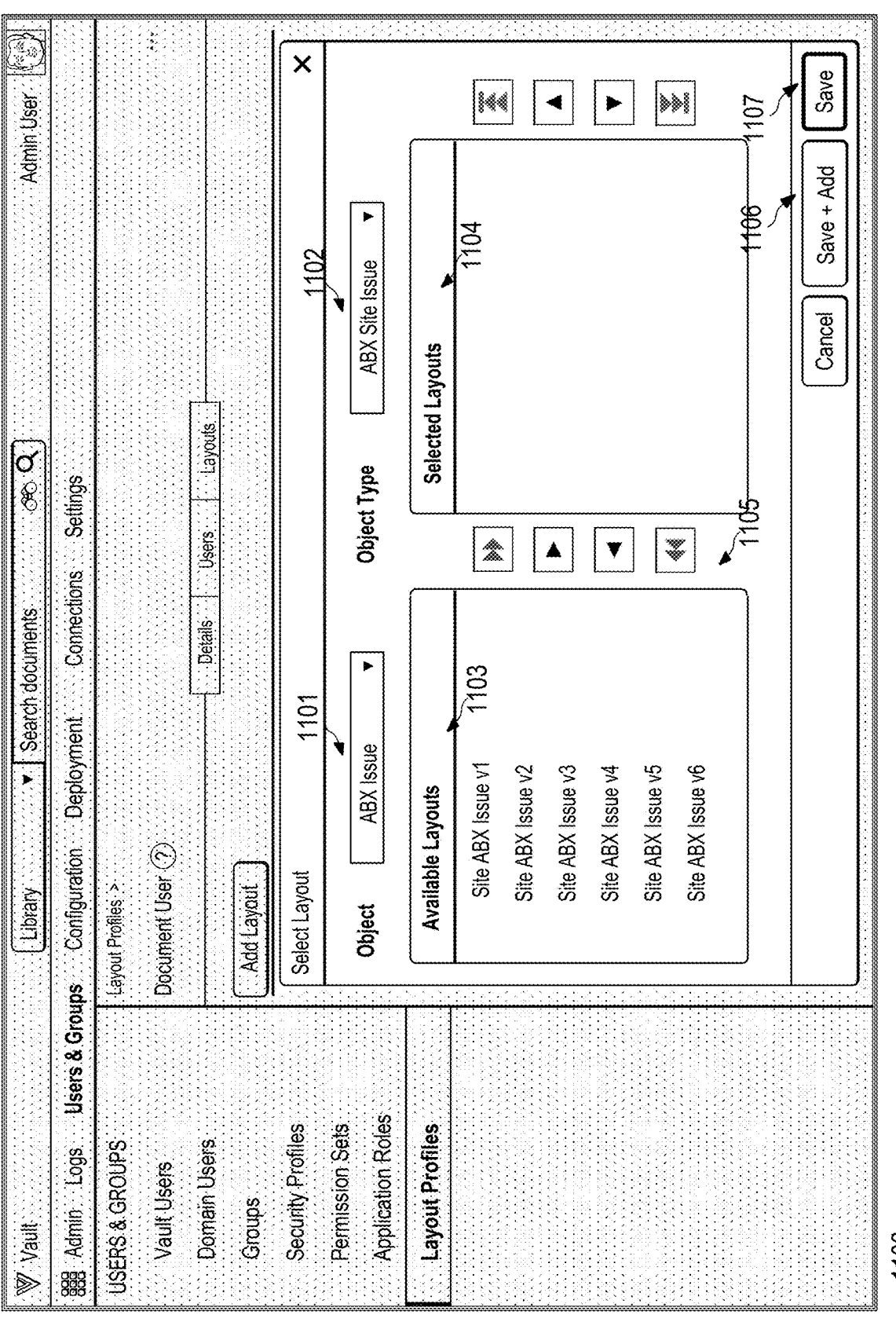
FIG. 11 illustrates another example of a user interface for configuring a view layout profile according to one embodiment of the present invention.

FIG. 11 illustrates another example of a user interface for configuring a view layout profile according to one embodiment of the present invention. View layouts for an object record may be accessed via the dropdown list 1101. Similarly, view layouts for an object type may be accessed via the dropdown list 1102. Available view layouts to assign to the view layout profile are listed in the list 1103. The controls 1105 are used to select and add an available view layout to the view layout profile. The Save+Add button 1106 and Save button 1107 are used to assign the selected view layouts to the view layout profile.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/ modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FP- GAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored. The computer readable media does not include carrier waves and electronic signals passing wirelessly or over wired connections.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:
1. A computer-implemented method for generation, categorization and rendering of custom dynamic view layout of secure customer data of a data storage, comprising:

accessing a first data object with a first data object type from the data storage upon successful authentication of a first user ID;

establishing a first custom dynamic view layout, wherein the first custom dynamic view layout corresponds to a second data object type and comprises at least one page including one or more sections used to organize a subset of a second data object of the second data object type from the data storage;

establishing a second custom dynamic view layout, wherein the second custom dynamic view layout corresponds to a third data object type and comprises at least one page including one or more sections used to organize a subset of a third data object of the third data object type from the data storage;

determining whether a view layout profile is enabled for the first user ID, wherein the view layout profile defines a list of approved custom dynamic view layouts corresponding to an object type of a data object for the first user ID;

assigning the first custom dynamic view layout to the view layout profile for the first user ID;

assigning the second custom dynamic view layout to the view layout profile for the first user ID;

comparing the first data object type, the second data object type and third data object type to identify an approved custom dynamic view layout corresponding to the object type of a data object for the first user ID that matches the first data object type of the accessed first data object from the data storage;

retrieving a subset of data fields of the first data object defined in the identified approved custom dynamic view layout;

enforcing layout rules defined in the identified approved custom dynamic view layout; and rendering the subset of data fields of the first data object defined in the identified approved custom dynamic view layout and displaying the rendered identified approved custom dynamic view layout to a display.

2. The computer-implemented method of claim 1 above, wherein each section of the first custom dynamic view layout includes a set of related data fields from the second data object.

3. The computer-implemented method of claim 1 above, wherein the first custom dynamic view layout has multiple pages with each page having one or more sections including a set of related data fields of the second data object from the data storage.

4. The computer-implemented method of claim 3 above, wherein each section of the second custom dynamic view layout includes a set of related data fields from the second data object.

5. The computer-implemented method of claim 3 above, wherein the second custom dynamic view layout has multiple pages with each page having one or more sections including a set of related data fields of the second data object from the data storage.

6. The computer-implemented method of claim 1 above, further comprising:

categorizing the first custom dynamic view layout according to a role or functionality.

7. The computer-implemented method of claim 1 above, wherein the data storage is a customer relationship management (CRM) system.

8. The computer-implemented method of claim 1 above, further comprising: determining whether an object type view layout is defined in the system corresponding to the first data object type of the first data object of the data storage.

9. The computer-implemented method of claim 1 above, further comprising: when the first data object type does not match the second data object type and third data object type, determining whether an object type view layout is defined in the system corresponding to the first data object type of the first data object of the data storage.

10. The computer-implemented method of claim 1 above, further comprising:

assigning the first custom dynamic view layout as a primary view layout in the view layout profile for the first user ID.

11. The computer-implemented method of claim 10 above, further comprising:

assigning the second custom dynamic view layout as a secondary view layout in the view layout profile for the first user ID.

12. The computer-implemented method of claim 11 above, further comprising:

rendering the subset of data fields of the data object according to the second custom dynamic view layout.

13. The computer-implemented method of claim 11 above, further comprising:

displaying the primary view layout first on the display by default.

14. The computer-implemented method of claim 10 above, further comprising:

rendering the subset of data fields of the first data object according to the first custom dynamic view layout.

15. The computer-implemented method of claim 10 above, further comprising:

displaying the secondary view layout after displaying the primary view layout on the display by default.

16. The computer-implemented method of claim 1 above, further comprising: determining whether an object type view layout is defined as default in the system corresponding to the first data object type of the first data object of the data storage.

17. The computer-implemented method of claim 1 above, further comprising: when the first data object type does not match the second data object type and third data object type, determining whether an object type view layout is defined as default in the system corresponding to the first data object type of the first data object of the data storage.

18. The computer-implemented method of claim 1 above, further comprising:

storing a component that defines the view layout profile for the first user ID, wherein the component defines a string label, string name, string description, and boolean active attribute.

19. The computer-implemented method of claim 18 above, further comprising:

storing a subcomponent that defines an object layout, wherein the subcomponent defines a string label, string name, component reference object, component reference object type, component reference page layout, and record creation layout with reference to page layout attribute.

* * * * *